(12) United States Patent
Wojciechowski et al.

(10) Patent No.: US 11,573,083 B2
(45) Date of Patent: Feb. 7, 2023

(54) VIAL MOUNTING SYSTEM FOR A BOX BEAM LEVEL

(71) Applicant: Diamond Tech LLC, Carson City, NV (US)

(72) Inventors: Timothy J. Wojciechowski, Hubertus, WI (US); David C. Mencel, Menomonee Falls, WI (US)

(73) Assignee: Diamond Tech LLC, Carson City, NV (US)

( * ) Notice: Subject to any disclaimer, the term of this patent is extended or adjusted under 35 U.S.C. 154(b) by 840 days.

(21) Appl. No.: 16/287,127

(22) Filed: Feb. 27, 2019

(65) Prior Publication Data
US 2020/0271448 A1   Aug. 27, 2020

(51) Int. Cl.
*G01C 9/34* (2006.01)
*G01C 9/28* (2006.01)

(52) U.S. Cl.
CPC ........ *G01C 9/28* (2013.01); *G01C 9/34* (2013.01)

(58) Field of Classification Search
CPC .................................... G01C 9/28; G01C 9/34
USPC .......................................................... 33/383
See application file for complete search history.

(56) References Cited

U.S. PATENT DOCUMENTS

| | | | |
|---|---|---|---|
| 764,092 A | 7/1904 | Wilcox | |
| 1,703,006 A | 2/1929 | Jay | |
| 2,692,440 A * | 10/1954 | Walters | G01C 9/24 33/383 |
| 2,825,144 A * | 3/1958 | Warden, Sr. | G01C 9/32 33/348 |
| 3,561,128 A * | 2/1971 | Ostrager | G01C 9/28 33/383 |
| 4,590,682 A * | 5/1986 | Koch | G01C 9/28 33/383 |
| 4,860,459 A | 8/1989 | Dengler | |
| 5,111,589 A | 5/1992 | Tate | |
| 5,177,873 A | 1/1993 | Tate | |
| 5,709,034 A | 1/1998 | Kohner | |
| 5,992,033 A | 11/1999 | Scarborough | |
| 6,176,020 B1 | 1/2001 | Scarborough | |
| 7,600,324 B2 | 10/2009 | Maruyama | |
| 8,291,604 B2 | 10/2012 | Christianson et al. | |
| 2007/0113414 A1* | 5/2007 | Levinson | G01C 9/34 33/451 |
| 2007/0266578 A1 | 11/2007 | Tran et al. | |
| 2009/0007447 A1 | 1/2009 | Maruyama | |
| 2016/0025490 A1* | 1/2016 | Hoppe | G01C 9/26 33/381 |
| 2016/0054124 A1* | 2/2016 | Schaefer | G01C 9/32 33/354 |

(Continued)

*Primary Examiner* — George B Bennett
(74) *Attorney, Agent, or Firm* — Boyle Fredrickson, S.C.

(57) ABSTRACT

A level includes a level body having top, bottom and side walls, and a window that opens into the interior of the body. A vial is positioned within the window. The vial is carried by, and rotatable relative to, a vial mount. The vial mount and the level body include engagement structure that fixes the vial mount against movement relative to the level body. Securing members, such as screws, are movably carried by the vial mount, and are engageable with the vial in order to selectively adjust the angular position of the vial relative to the level body and to selectively fix the angular position of the vial relative to the vial mount, and thereby relative to the level body.

21 Claims, 9 Drawing Sheets

(56) References Cited

U.S. PATENT DOCUMENTS

| | | | |
|---|---|---|---|
| 2016/0076886 A1* | 3/2016 | Carniato | G01C 9/26 33/301 |
| 2016/0138918 A1* | 5/2016 | Neitzell | G01C 25/00 33/381 |
| 2017/0131098 A1 | 5/2017 | Yu | |

* cited by examiner

VIAL MOUNTING SYSTEM FOR A BOX BEAM LEVEL

BACKGROUND AND SUMMARY

This invention relates to a level, and more particularly to a system for mounting a level vial to a box-type body of a level.

A level typically includes at least one vial for indicating the position of a surface relative to level, along with other vials, such as one or more plumb vials, for indicating the position of a surface relative to vertical. Various types of levels are known, with typical examples being levels having a box-type level body and levels having an I-beam type level body. In levels having a box-type level body, a vial, such as a plumb vial, is mounted within the interior of the level body so that the vial is visible from both sides of the level body. This typically involves forming openings in the sidewalls of the level body, through which the vial is viewed. Because the level body involves relatively thin sidewalls and an open interior, challenges are presented in securing the vial to the level body in a manner that enables the orientation of the vial to be adjusted to ensure its orientation relative to the level body to provide accurate measurement. The level vial mounting system of the present invention addresses these challenges.

In accordance with a first aspect of the invention, a level includes a level body extending along a longitudinal axis and including a top wall, a bottom wall and a pair of sidewalls extending between and interconnecting the top wall and the bottom wall. The top wall, the bottom wall and the sidewalls cooperate to define an interior of the level body, and the level body includes a window opening. A vial is positioned within the window opening of the level body. The vial is carried by a vial mount, and the vial is rotatably movable relative to the vial mount. The vial mount and the level body include engagement structure that fixes the vial mount against movement relative to the level body in a direction transverse to the longitudinal axis of the level body. One or more securing members are movably carried by the vial mount and are engageable with the vial and are configured and arranged to selectively adjust an angular position of the vial relative to the level body and to selectively fix the angular position of the vial relative to the vial mount, and thereby relative to the level body.

In one form, the engagement structure includes upper and lower engagement surfaces on the vial mount that are engageable with top and bottom interior surfaces, respectively, of the level body that define the interior of the level body. The top and bottom interior surfaces of the level body may representatively be defined by the top wall and the bottom wall, respectively, of the level body. The level body may include an opening in an end defined by the level body, and which is in communication with the interior of the level body. The vial mount may be engaged with the level body via axial movement of the vial mount through the opening into the interior of the level body. The upper and lower engagement surfaces on the vial mount may be in the form of resilient engagement portions that compress upon contact with the top and bottom interior surfaces, respectively, of the level body. A fixing member may be engaged between the level body and the vial mount to fix the position of the vial mount relative to the level body along the longitudinal axis of the level body.

The vial may be positioned within an opening defined by the vial mount and is rotatable relative to the vial mount about an axis of rotation. The vial includes first and second engagement surfaces located one on either side of the axis of rotation of the vial. The one or more securing members may be in the form of a pair of threaded members that are received within threaded passages defined by the vial mount, with each threaded member being movable into engagement with one of the engagement surfaces so that movement of the threaded members selectively causes rotation of the vial within the opening.

In one embodiment, the vial mount includes a pair of recesses located one on either side of the axis of rotation and extending outwardly from the opening. The first and second engagement surfaces may be in the form of a pair of tabs on the vial, each of which is received within one of the recesses. Each threaded member is movable into engagement with one of the tabs so that movement of the threaded members selectively causes rotation of the vial within the opening. The tabs may be provided on a ring member configured to be received within the opening of the vial mount, and wherein the vial is positioned within an interior defined by the ring member.

In another embodiment, the vial may be interconnected with a vial carrier, and the first and second engagement surfaces are provided on the vial carrier.

Another aspect of the present invention contemplates a method of securing a level vial to a level body, which includes similar features to those described above. The method involves rotatably engaging a vial with a vial mount so that the vial is rotatable relative to the vial mount about an axis of rotation; positioning the vial mount within the interior of the level body and engaging the vial mount with the level body in a manner that prevents movement of the vial mount relative to the level body in a direction transverse to the longitudinal axis of the level body, with the vial mount being positioned such that the vial is visible through the window opening; and adjusting the position of the vial relative to the vial mount about the axis of rotation of the vial using a pair of securing members that are movably mounted to the vial mount and selectively engageable with the vial. The act of engaging the vial mount with the level body may be carried out by engaging top and bottom resilient portions of the vial mount with inner surfaces defined by the top and bottom walls, respectively, of the level body. The level body may define an end having an opening through which the interior of the level body is accessible, and the act of engaging the vial mount with the level body may be carried out by inserting the vial mount through the opening and into the interior of the level body.

Representatively, the pair of securing members may be in the form of a pair of threaded adjustment members threadedly engaged within passages defined by the vial mount, with the passages and the threaded adjustment members being located on opposite sides of the axis of rotation of the vial. The threaded adjustment members may be selectively moved relative to the vial mount using a tool to access the threaded adjustment members through the opening in the end of the level body.

The vial mount may include an opening within which the vial is positioned, and the vial may be carried by a ring that is rotatably positioned within the opening. The ring may include a pair of tabs located one on either side of the axis of rotation of the vial, and the threaded adjustment members may be engageable with the tabs so as to selectively cause rotation of the ring, and thereby the vial, relative to the vial mount. The vial mount may include a pair of recesses and each may be positioned within one of the recesses, such that the recesses accommodate movement of the tabs relative to the vial mount. Alternatively, the vial may be carried by a vial carrier that is rotatable within the opening, and the pair of threaded adjustment members are engageable with engagement surfaces defined by the vial carrier on either side of the axis of rotation of the vial relative to the vial mount.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to be exemplary, and therefore non-limiting, embodiment illustrated in the drawings accompanying and forming a part of this specification, wherein like reference numerals designate the same elements can be several views, and in which.

In describing the embodiments of the invention illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Figure 1:
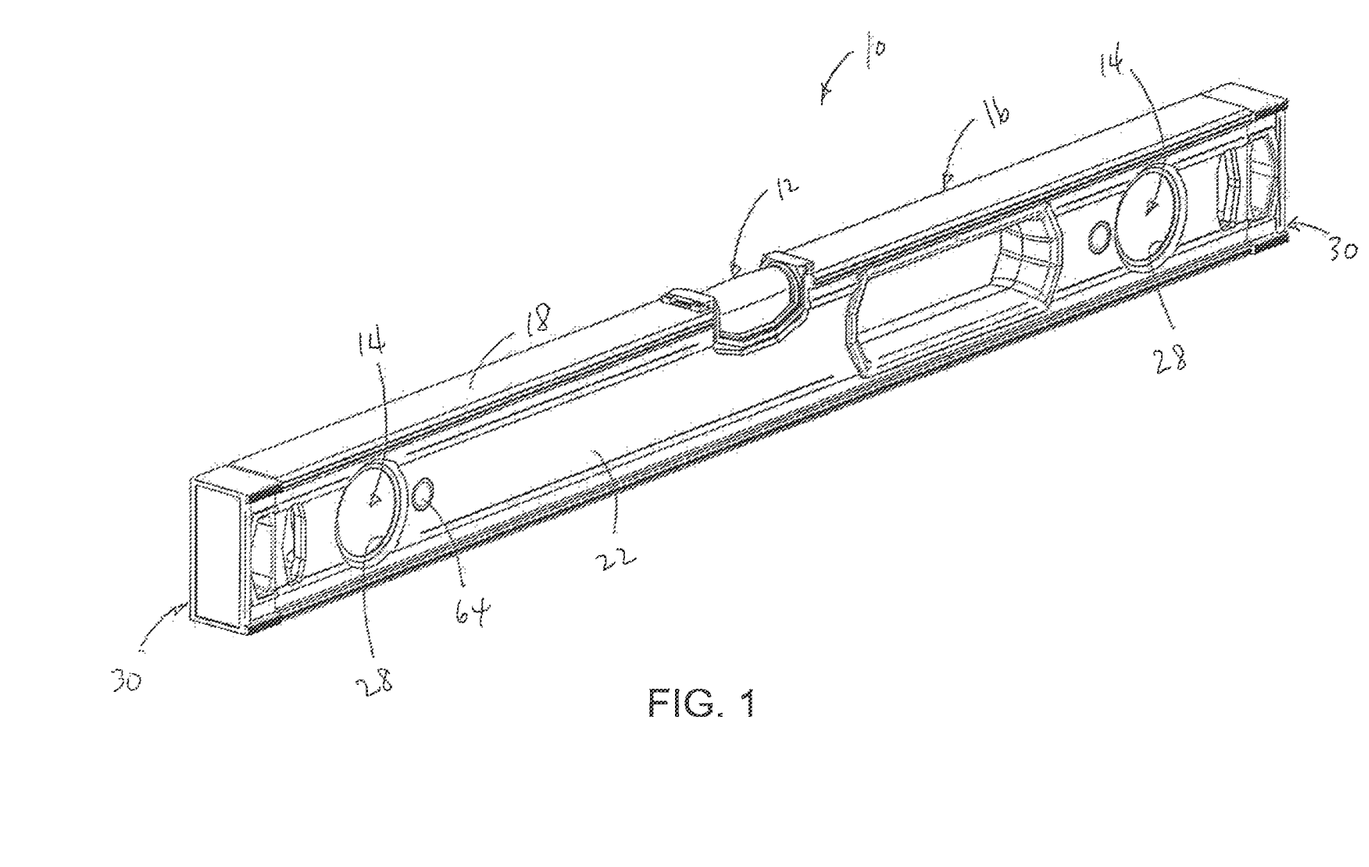
FIG. 1 is an isometric view of a level incorporating a vial mounting system in accordance with the present invention.
Figure 2:
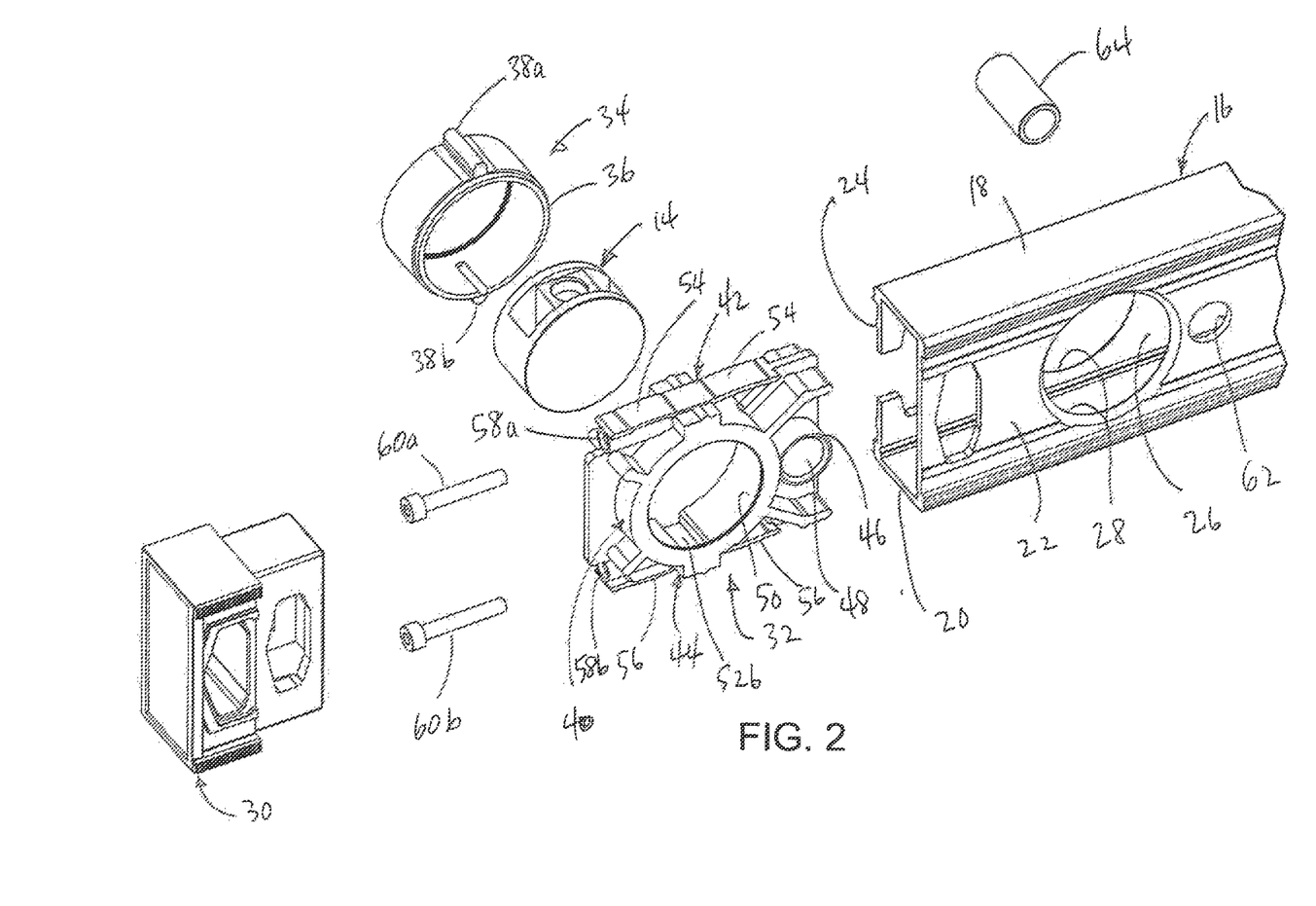
FIG. 2 is a partial exploded isometric view showing a portion of the frame of the level of FIG. 1 and the components of a first embodiment of a vial mounting system in accordance with the present invention.
Figure 3:
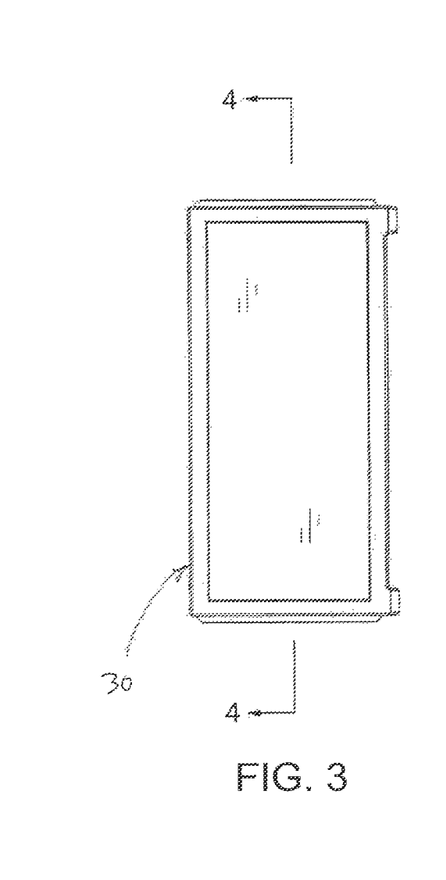
FIG. 3 is an end elevation view of the level of FIG. 1.

FIG. 1 illustrates a level 10 that includes a level vial 12 and a pair of vials 14, which are configured to measure the orientation of the surface other than relative to level, such as relative to plumb or 45° to level and plumb. The vials 14 may be secured in position on the level 12 using a vial mounting system in accordance with the present invention. In a manner as is known, as shown in FIGS. 1 and 2, the level 10 includes a box-type frame or body 16 having a top wall 18, a bottom wall 20, and a pair of sidewalls 22, 24 that extend between and interconnect top wall 18 and bottom wall 20. The top wall 18, bottom wall 20 and sidewalls 22, 24 cooperate to define an interior 26 of level body 16.

The level body 16 includes windows 28 that provide visibility of level vials 14. In the illustrated embodiment, the windows 28 are formed by circular openings in the sidewalls 22, 24 of the level body 16.

The level 10 also includes a pair of end caps 30, which are secured to the ends of level body 16. The end caps 30 may be removably secured to the level body 16, such as via a removable end cap mounting arrangement as shown and described in Wojciechowsi U.S. Pat. No. 9,970,760, the disclosure of which is hereby incorporated by reference. It is understood, however, that any type of suitable end cap mounting arrangement may be employed.

As shown in FIG. 2, the vial mounting system of the present invention includes a vial mount 32 and an adjustment ring 34, which cooperate to secure the vial 14 to the level body 16. In a manner as is known, the vial 14 is a block-type vial having a generally circular configuration, with a cylindrical cavity formed therein, within which a quantity of liquid is disposed in order to form a bubble.

The adjustment ring 34 includes a generally circular wall 36, the inner surface of which is configured to closely correspond to the configuration of the external surface of vial 14. In this manner, vial 14 is received within the interior space defined by the circular wall 36. An adhesive may be positioned between the outer surfaces of vial 14 and the inner surface of circular wall 36, so as to fix the position of vial 14 relative to adjustment ring 34. In addition, adjustment ring 34 includes a pair of outwardly extending tabs shown at 38a, 38b. In the illustrated embodiment, the tabs 38a, 38b are diametrically opposed from each other, extending outwardly from the outer surface of circular wall 36. It is understood, however, that the tabs 38a, 38b may be positioned at any other angular relationship relative to each other.

The vial mount 32 includes a vial mounting section 40 in combination with an upper engagement section 42 and a lower engagement section 44, which are located above and below, respectively, the vial mounting section 40. Vial mount 32 further includes a transversely oriented generally cylindrical wall 46 that defines a transverse retainer passage 48.

Vial mounting section 40 is formed to include a generally circular wall, which defines a generally circular inner surface 50. Vial mounting section 40 further includes a pair of transversely extending slots or recesses shown at 52a, 52b (FIG. 4) that extend outwardly from the top and bottom, respectively, of the inner surface 50.

Upper engagement section 42 of vial mount 40 includes a pair of axially spaced resilient walls 54. Similarly, lower engagement section 42 of vial mount 40 includes a pair of axially spaced resilient walls 56. Resilient walls 54 have an arcuate configuration extending upwardly from the top of vial mount 40, and likewise resilient walls 56 have an arcuate configuration extending downwardly from the bottom of vial mount 40. Vial mount 40 is formed with gaps or voids below upper resilient walls 54 and above lower resilient walls 56.

Vial mount 40 further includes an axially extending upper threaded passage 58a and an axially extending lower threaded passage 58b. Passages 58a, 58b extend between the end of vial mount 40 and slots 52a, 52b, respectively. A threaded adjustment and securing member, in the form of a screw 60a, is threadedly engageable within upper threaded passage 58a, and likewise a threaded and adjustment securing member, in the form of a screw 60b, is threadedly engageable within lower threaded passage 58b.

In order to secure the vial 14 to the level body 16, the vial 14 is first secured to the adjustment ring 34, as described above. Subsequently, the adjustment ring 34, with the vial 14 mounted thereto, is engaged with the vial mount 32 by positioning the adjustment ring 34 within the circular recess defined by the circular inner surface 50 of vial mounting section 40 of vial mount 32. Adjustment ring 34 is positioned such that upper tab 38a is received within slot 52a and adjustment tab 38b is received within slot 52b.

With vial 14 secured to adjustment ring 34 and adjustment ring 34 in turn engaged with vial mount 32, vial mount 32 is inserted into the interior 26 of level body 16 through the open end of level body 16. As vial mount 32 is advanced axially into the interior 26 of level body 16, the upper resilient walls 54 come into contact with the inner surface of level body top wall 18 and the lower resilient walls 56 come into contact with the inner surface of the level body bottom wall 20. The overall height of vial mount 32, as defined by the vertical dimension between the upper surfaces of upper resilient wall 54 and the lower surfaces of lower resilient walls 56, is slightly greater than the height of the level body interior 26 defined between the facing inner surfaces of top all 18 and bottom wall 20. Accordingly, as vial mount 32 is advanced into the level body interior 26, the upper resilient walls 54 and the lower resilient walls 56 flex inwardly and toward each other to provide a secure frictional engagement of vial mount 32 within the level body interior 26 in a manner that prevents movement of vial mount 32 in a direction transverse to the longitudinal axis of level body 16, i.e. upward and downward movement of vial mount 32. The position of vial 14 relative to the level body 16 in the transverse direction relative to level body 16 is thus fixed.

Figure 6:
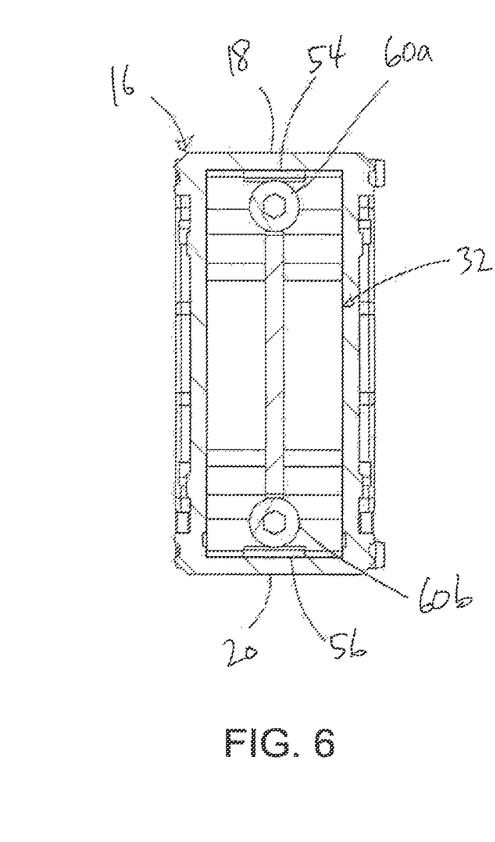
FIG. 6 is a section view taken along line 6-6 of FIG. 5.
Figure 7:
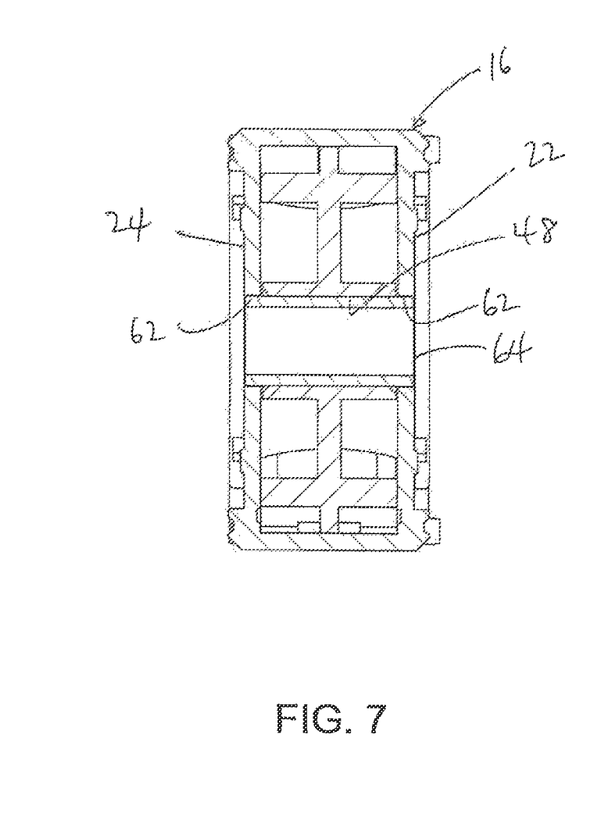
FIG. 7 is a section view taken along line 7-7 of FIG. 5.

Vial mount 32 is advanced to a position in which the circular opening defined by inner surface 50 of vial mounting section 40 is aligned with window openings 28 in level body side walls 22, 24. When vial mount 32 is so positioned, the transverse retainer passage 48 is aligned with a pair of openings 62 in level body side walls 22, 24. A transverse fixing member, which may be in the form of a pin or dowel 64, is inserted into the aligned openings 62 and passage 48, so as to fix the vial mount 32 against axial movement relative to level body 16.

Figure 4:
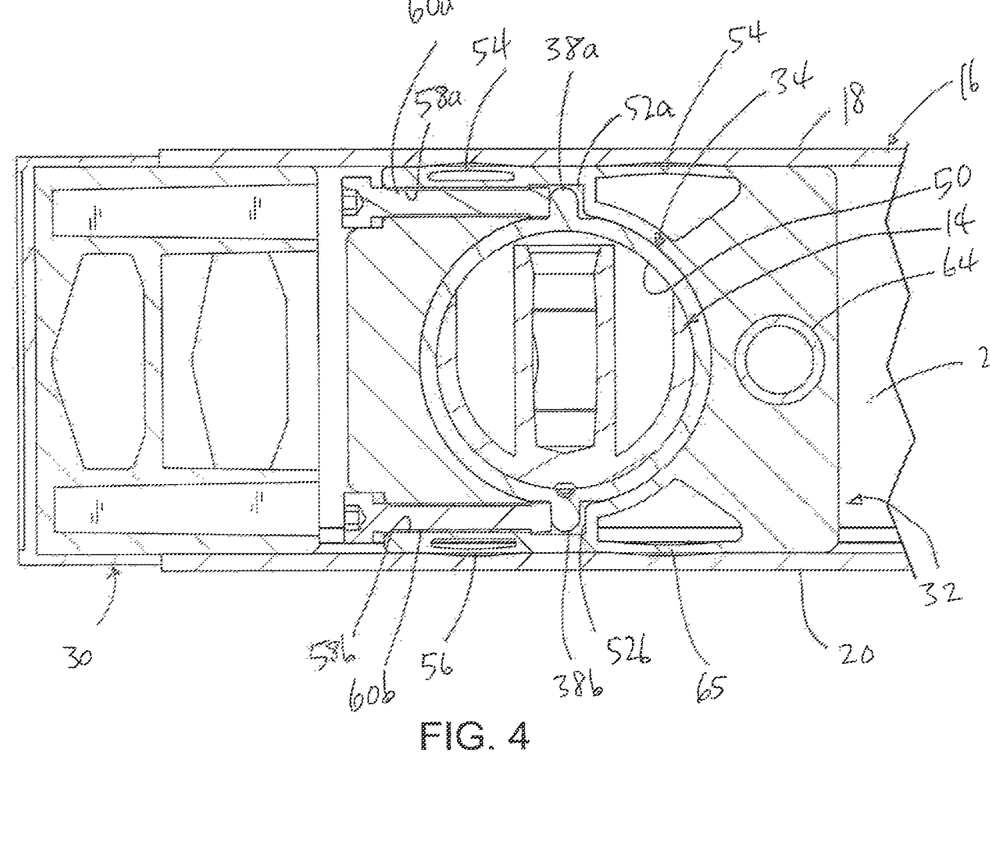
FIG. 4 is a partial section view taken along line 4-4 of FIG. 3.
Figure 5:
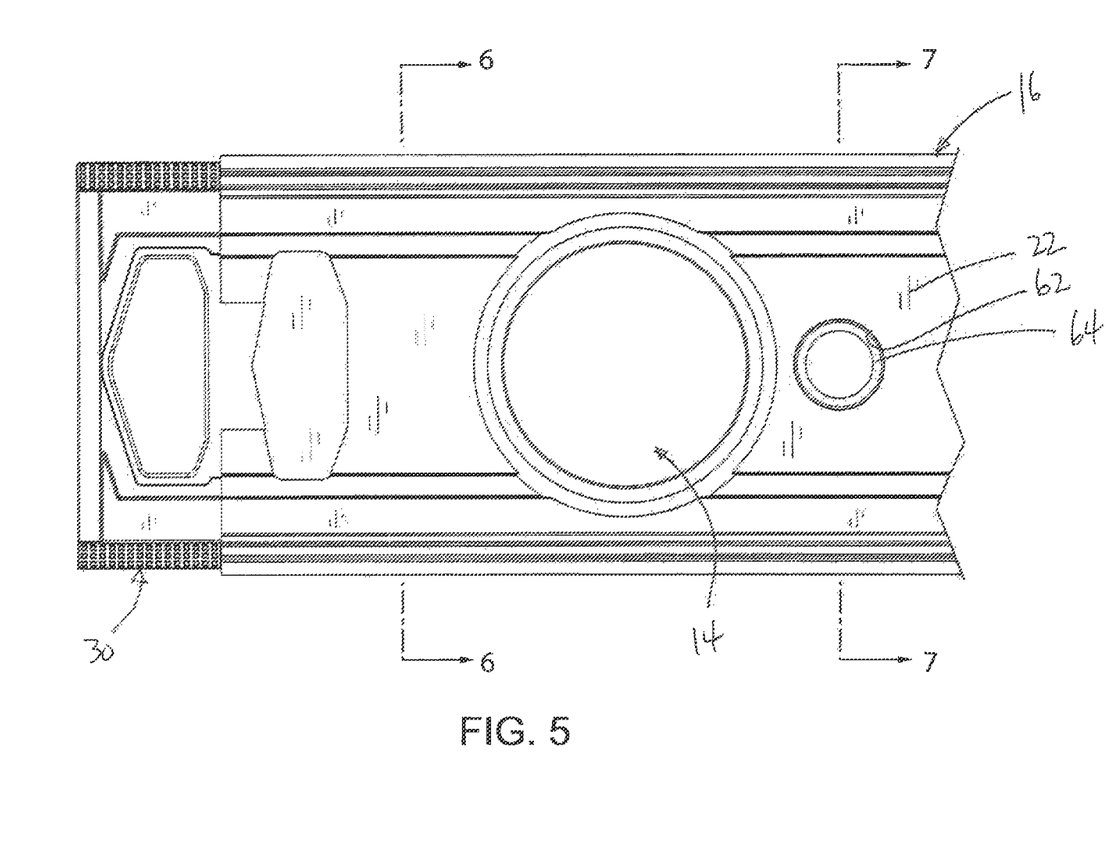
FIG. 5 is a partial side elevation view of the level of FIG. 1.

Once vial mount 32 has been positioned within the interior 26 of level body 16 as described above, the level body 16 is calibrated. To accomplish this, one of the engaging surfaces of the level body 16 is placed on a reference surface of and the rotational position of vial 14 is adjusted to place vial 14 in a desired angular position. For example, as shown in FIG. 4, the vial 14 may be adjusted so that the longitudinal axis of the vial cavity is perpendicular to the longitudinal axis of the level body 16. In order to provide such fine adjustment of vial 14, the user selectively advances or withdraws screws 60a, 60b within respective passages 58a, 58b, such as by using a driver that is inserted through the open end of the level body 16 into engagement with the heads of screws 58a, 58b. The inner ends of screws 58a, 58b act on tabs 38a, 38b, respectively, to selectively rotate the vial 14 relative to the vial mount 32. During such adjustment in the rotational position of vial 14, the recesses or slots 52a, 52b accommodate movement of tabs 38a, 38b, respectively. Once the desired orientation of vial 14 is obtained, the end cap 30 is secured to the level body 16.

FIGS. 8-13 illustrate an alternative embodiment of a vial mounting system in accordance with the present invention, and like reference characters will be used where possible to facilitate clarity. This embodiment contemplates a vial 70 that has circular faces 72 dimensioned to be positioned within the window openings 28. As described previously, the vial 70 includes a cylindrical cavity within which a quantity of fluid is disposed in order to form a bubble, in a manner as is known. In addition, between the circular faces 72, the vial 70 includes an engagement section 74 that defines an upper engagement surface 76a and a lower engagement surface 70 6B.

Figure 8:
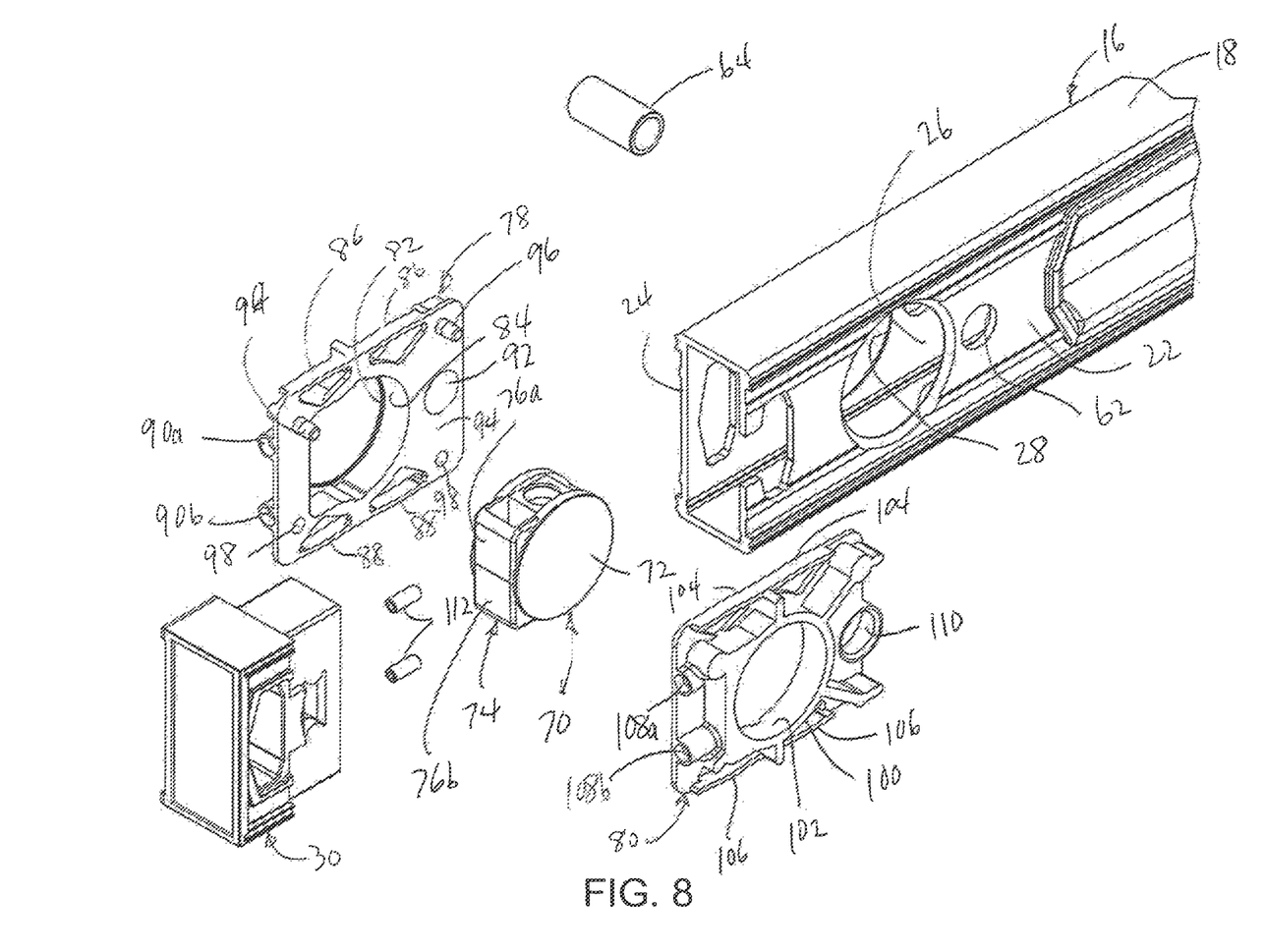
FIG. 8 is a partial exploded isometric view showing a portion of a level frame and the components of a second embodiment of a vial mounting system in accordance with the present invention.
Figure 9:
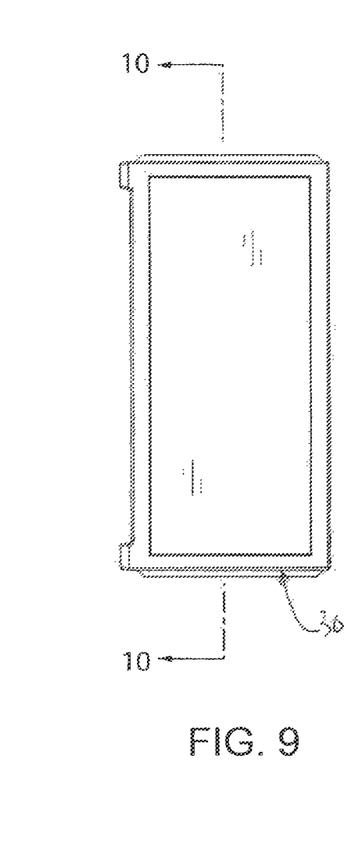
FIG. 9 is an end elevation view of a level constructed with the components of the vial mounting system as shown in FIG. 8.

The vial 70 is secured to the level body 16 via a vial mount consisting of a first vial mount section 78 and a second vial mount section 80. The vial mount sections 78, 80 are generally mirror images of each other. Vial mount section 78 is formed with a generally circular wall 82 that defines an inner surface 84. Vial mount section 78 further includes axially spaced apart upper resilient walls 86 and axially spaced apart lower resilient walls 88. Vial mount section 78 further includes upper and lower threaded passages 90a, 90b, and a transverse passage 92 that opens onto an inner face 94. Upper pins 96 extend outwardly from inner face 94, and lower passages 98 extend inwardly from inner face 94.

Vial mount section 80 is similarly constructed, including a generally circular wall 100 defining an inner surface 102, axially spaced upper resilient walls 104 and axially spaced lower resilient walls 106, an upper threaded passage 108a and a lower threaded passage 108b, and a transverse passage 110. Vial mount section 80 further includes an inner face 112 (FIG. 13), upper passages 114 extending inwardly from inner face 112 and lower pins 116 extending outwardly from inner face 112.

With this construction, vial mount sections 78, 80 are configured to be brought together and secured to each other, with vial 70 therebetween and received within the cavity defined by inner surfaces 84, 102 of vial mount sections 78, 80, respectively. When engaged together in this manner, the pins 96 of vial mount section 78 are received within the passages 114 of vial mount section 80, and likewise the pins 116 of vial mount section 80 are received within the passages 98 of vial mount section 78. The vial mount sections 78, 80 may be secured to each other using adhesive, sonic welding, or in any other satisfactory manner. When the vial mount sections 78, 80 are secured together, the respective transverse passages 92, 110 are positioned in alignment with each other.

Threaded adjustment and securing members, such as shown at screws 112, are engaged within the threaded passages 90a, 90b and 108a, 108b.

Figure 10:
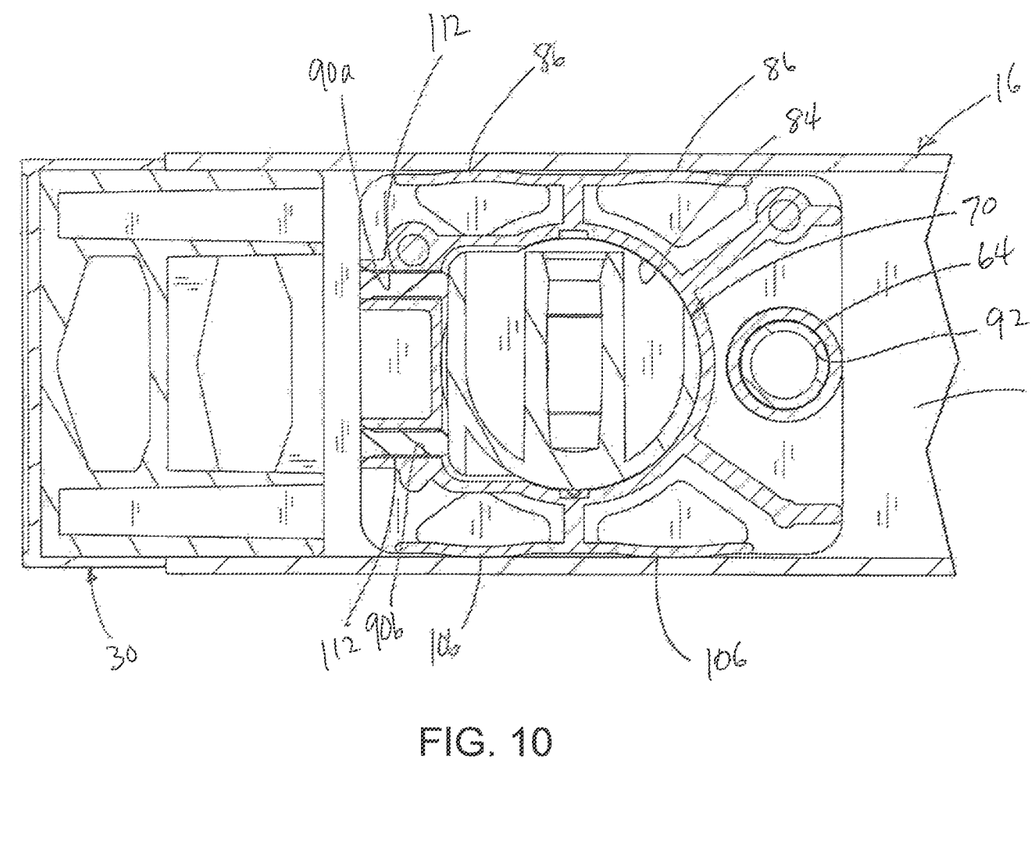
FIG. 10 is a section view taken along line 10-10 of FIG. 9.
Figure 11:
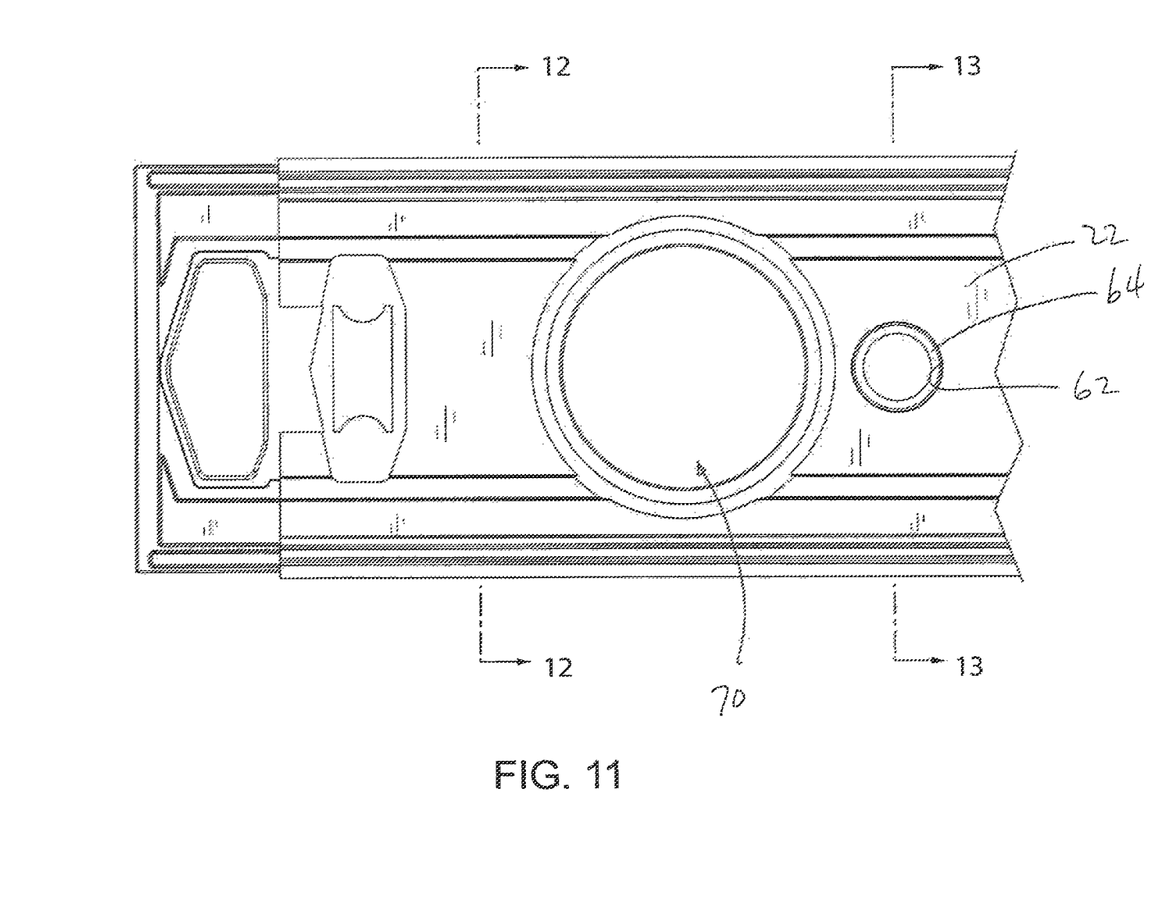
FIG. 11 is a partial side elevation view of the level of FIGS. 8-10.
Figure 12:
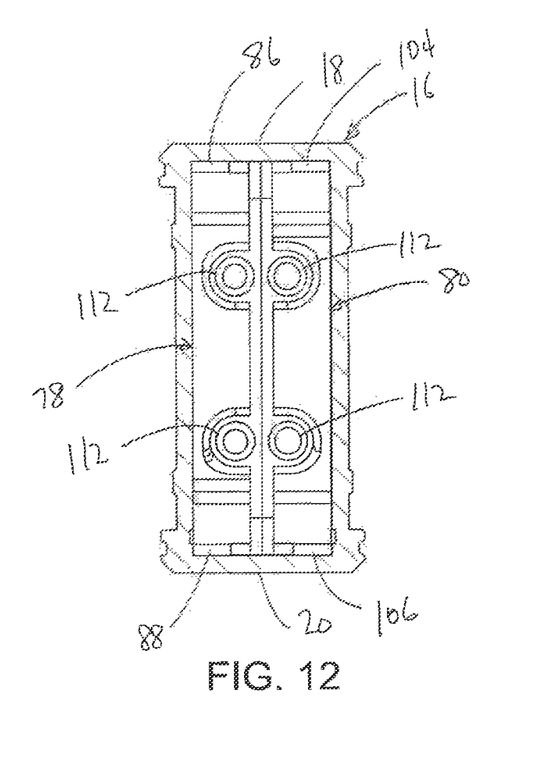
FIG. 12 is a section view taken along line 12-12 of FIG. 11.
Figure 13:
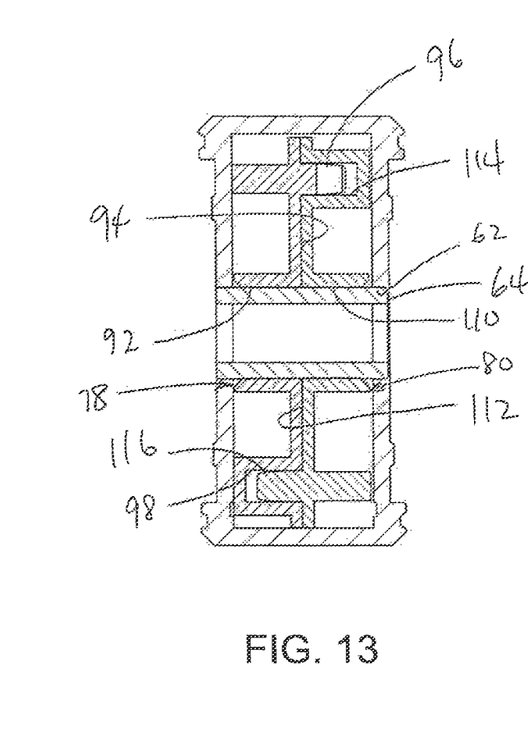
FIG. 13 is a section view taken along line 13-13 of FIG. 11.

The vial mount assembly formed by vial mount sections 78, 80 and vial 70 is then advanced into the interior 26 of the level body 16 in a manner similar to that described above. During such movement of the vial mount assembly into the interior 26 of level body 16, the upper resilient walls 86, 104 and lower resilient walls 88, 106 flex inwardly upon engagement with the inner surfaces of level body top wall 18 and bottom wall 20, as described above, to provide secure frictional engagement of the vial mount assembly with the level body 16. When the desired axial position of the vial mount assembly is obtained, the vial 70 is in alignment with the level body window openings 28 and the passages 92, 110 are in alignment with the level body openings 62. The dowel 64 is then inserted into the aligned openings 62 and passages 92, 110 to fix the axial position of the vial mount assembly relative to the level body 16. A driving tool is then inserted into the open end of the level body 16 and into engagement with the screws 112, which are advanced or withdrawn toward and away from the upper lower engagement surfaces 76a, 76b of the level vial 70, to adjust the rotational position of the level vial 70 relative to the vial mount assembly, in a manner similar to that described above. Once the appropriate position of vial 70 has been attained, the end cap 30 is engaged with the end of the level body 16.

It can thus be appreciated that the vial mounting system of the present invention as shown and described provides a relatively simple and secure means for engaging a vial with a level body and maintaining it in position. The vial mounting system also provides the ability to adjust the position of the vial relative to the level body both during original manufacture and thereafter, if necessary.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A level, comprising:
a level body extending along a longitudinal axis and including a top wall, a bottom wall and a pair of sidewalls extending between and interconnecting the top wall and the bottom wall, wherein the top wall, the bottom wall and the sidewalls cooperate to define an interior of the level body, and wherein the level body includes a window opening;
a vial positioned within the window opening of the level body, wherein the vial is carried by a vial mount and wherein the vial is rotatably movable relative to the vial mount, and wherein the vial mount and the level body include engagement structure that fixes the vial mount against movement relative to the level body in a direction transverse to the longitudinal axis of the level body; and
one or more securing members movably carried by the vial mount, wherein the one or more securing members are engageable with the vial and are configured and arranged to selectively adjust an angular position of the vial relative to the level body and to selectively fix the angular position of the vial relative to the vial mount, and thereby relative to the level body.

2. The level of claim 1, wherein the engagement structure comprises upper and lower engagement surfaces on the vial mount that are engageable with top and bottom interior surfaces, respectively, of the level body that define the interior of the level body.

3. The level of claim 2, wherein the top and bottom interior surfaces of the level body are defined by the top wall and the bottom wall, respectively, of the level body.

4. The level of claim 2, wherein the level body includes an opening in an end defined by the level body, wherein the opening is in communication with the interior of the level body, and wherein the vial mount is engaged with the level body via axial movement of the vial mount through the opening into the interior of the level body, and wherein the upper and lower engagement surfaces on the vial mount are defined by resilient engagement portions that compress upon contact with the top and bottom interior surfaces, respectively, of the level body.

5. The level of claim 1, wherein the interior of the level body comprises a passage that opens onto an end defined by the level body, wherein the vial mount is engaged with the level body via axial movement of the vial mount from the end of the level body into the passage, and further comprising a fixing member engaged between the level body and the vial mount to fix the position of the vial mount relative to the level body along the longitudinal axis of the level body.

6. The level of claim 1, wherein the vial is positioned within an opening defined by the vial mount and is rotatable relative to the vial mount about an axis of rotation, and wherein the vial includes first and second engagement surfaces located one on either side of the axis of rotation of the vial, and wherein the one or more securing members comprises a pair of threaded members that are received within threaded passages defined by the vial mount, wherein each threaded member is movable into engagement with one of the engagement surfaces so that movement of the threaded members selectively causes rotation of the vial within the opening.

7. The level of claim 6, wherein the vial mount further includes a pair of recesses located one on either side of the axis of rotation and extending outwardly from the opening, and wherein the first and second engagement surfaces comprise a pair of tabs on the vial, each of which is received within one of the recesses, and wherein each threaded member is movable into engagement with one of the tabs so that movement of the threaded members selectively causes rotation of the vial within the opening.

8. The level of claim 7, wherein the tabs are provided on a ring member configured to be received within the opening of the vial mount, and wherein the vial is positioned within an interior defined by the ring member.

9. The level of claim 6, wherein the vial is interconnected with a vial carrier, and wherein the first and second engagement surfaces are provided on the vial carrier.

10. A level, comprising:
a level body extending along a longitudinal axis and including a top wall, a bottom wall and a pair of sidewalls extending between and interconnecting the top wall and the bottom wall, wherein the top wall, the bottom wall and the sidewalls cooperate to define an interior of the level body, wherein the level body includes an opening in an end defined by the level body through which the interior of the level body is accessible, and wherein the level body further includes a window opening;

a vial positioned within the window opening of the level body, wherein the vial is carried by a vial mount and wherein the vial is rotatably movable relative to the vial mount, and wherein the vial mount is configured to be positioned within the interior of the level body via movement through the opening in the end defined by the level body, and wherein the vial mount is engaged with the level body against movement relative to the level body in a direction transverse to the longitudinal axis of the level body;

wherein the vial is positioned within an opening defined by the vial mount and is rotatable relative to the vial mount about an axis of rotation, and wherein the vial includes first and second engagement surfaces located one on either side of the axis of rotation of the vial; and a pair of threaded members that are received within threaded passages defined by the vial mount, wherein each threaded member is movable into engagement with one of the engagement surfaces so that movement of the threaded members selectively causes rotation of the vial within the opening.

11. The level of claim 10, wherein the vial mount further includes a pair of recesses located one on either side of the axis of rotation and extending outwardly from the opening, and wherein the first and second engagement surfaces comprise a pair of tabs on the vial, each of which is received within one of the recesses, and wherein each threaded member is movable into engagement with one of the tabs so that movement of the threaded members selectively causes rotation of the vial within the opening.

12. The level of claim 10, wherein the vial is interconnected with a vial carrier, and wherein the first and second engagement surfaces are provided on the vial carrier.

13. A method of securing a level vial to a level body that extends along a longitudinal axis, wherein the level body includes a top wall, a bottom wall and a pair of sidewalls extending between and interconnecting the top wall and the bottom wall, wherein the top wall, the bottom wall and the sidewalls cooperate to define an interior of the level body, and wherein the level body includes a window opening, comprising the acts of:

rotatably engaging a vial with a vial mount so that the vial is rotatable relative to the vial mount about an axis of rotation;

positioning the vial mount within the interior of the level body and engaging the vial mount with the level body in a manner that prevents movement of the vial mount relative to the level body in a direction transverse to the longitudinal axis of the level body, wherein the vial mount is positioned such that the vial is visible through the window opening; and adjusting the position of the vial relative to the vial mount about the axis of rotation of the vial using a pair of securing members that are movably mounted to the vial mount and selectively engageable with the vial.

14. The method of claim 13, wherein the act of engaging the vial mount with the level body in a manner that prevents movement of the vial mount relative to the level body in a direction transverse to the longitudinal axis of the level body is carried out by engaging top and bottom resilient portions of the vial mount with inner surfaces defined by the top and bottom walls, respectively, of the level body.

15. The method of claim 14, wherein the level body defines an end having an opening through which the interior of the level body is accessible, and wherein the act of engaging the vial mount with the level body is carried out by inserting the vial mount through the opening and into the interior of the level body.

16. The method of claim 13, wherein the pair of securing members comprises a pair of threaded adjustment members threadedly engaged within passages defined by the vial mount, wherein the passages and the threaded adjustment members are located on opposite sides of the axis of rotation of the vial.

17. The method of claim 16, wherein the level body defines an end having an opening through which the interior of the level body is accessible, and wherein the threaded adjustment members are selectively moved relative to the vial mount using a tool to access the threaded adjustment members through the opening.

18. The method of claim 16, wherein the vial mount includes an opening within which the vial is positioned, wherein the vial is carried by a ring that is rotatably positioned within the opening.

19. The method of claim 18, wherein the ring includes a pair of tabs located one on either side of the axis of rotation of the vial, wherein each threaded adjustment members are engageable with the tabs so as to selectively cause rotation of the ring, and thereby the vial, relative to the vial mount.

20. The method of claim 19, wherein the vial mount includes a pair of recesses, wherein each tab is positioned within one of the recesses, and wherein the recesses accommodate movement of the tabs relative to the vial mount.

21. The method of claim 16, wherein the vial mount includes an opening within which the vial is positioned, wherein the vial is carried by a vial carrier that is rotatable within the opening, and wherein the pair of threaded adjustment members are engageable with engagement surfaces defined by the vial carrier on either side of the axis of rotation of the vial relative to the vial mount.

* * * * *